United States Patent
Dooze et al.

(10) Patent No.: US 10,931,537 B2
(45) Date of Patent: Feb. 23, 2021

(54) METHOD AND DEVICE FOR UPDATING A PREDICTIVE MODEL OF A VARIABLE RELATING TO A MOBILE TERMINAL

(71) Applicant: Orange, Paris (FR)

(72) Inventors: Philippe Dooze, Châtillon (FR); Alassane Samba, Châtillon (FR); Eric Debeau, Châtillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/349,585

(22) PCT Filed: Nov. 10, 2017

(86) PCT No.: PCT/FR2017/053074
§ 371 (c)(1),
(2) Date: May 13, 2019

(87) PCT Pub. No.: WO2018/087491
PCT Pub. Date: May 17, 2018

(65) Prior Publication Data
US 2019/0349265 A1    Nov. 14, 2019

(30) Foreign Application Priority Data
Nov. 14, 2016    (FR) ...................................... 1660991

(51) Int. Cl.
*H04L 12/24*    (2006.01)
*H04L 12/26*    (2006.01)
*H04W 88/02*    (2009.01)

(52) U.S. Cl.
CPC ............ *H04L 41/147* (2013.01); *H04L 43/16* (2013.01); *H04W 88/02* (2013.01)

(58) Field of Classification Search
CPC ....... H04L 41/147; H04L 43/16; H04L 67/18; H04W 88/02; H04W 4/029; H04W 48/04;
(Continued)

(56) References Cited

U.S. PATENT DOCUMENTS

2005/0220016 A1    10/2005 Yasuie et al.
2010/0077077 A1    3/2010 Devitt
(Continued)

OTHER PUBLICATIONS

International Search Report and Written Opinion dated Jan. 22, 2018 for Application No. PCT/FR2017/053074.

*Primary Examiner* — Dady Chery
(74) *Attorney, Agent, or Firm* — Knobbe, Martens, Olson & Bear, LLP

(57) ABSTRACT

A method for updating a predictive model of a variable representing the operation of a mobile terminal connected to a communication network by packets is described. A first predictive model is configured to estimate a value of the variable as a function of the value of predictors, linked to the variable by a common operating context. The method can be implemented by the mobile terminal and can include generating a feed message, comprising at least the measured value and the values of the predictors, if the difference between the measured value and the estimated value is greater than or equal to a determined threshold, called the feed threshold, the method can further include transmitting the at least one feed message generated, to an update server connected to the network, receiving an update message, comprising a second predictive model updated on the basis of at least the feed message, coming from the update server, and replacing the first predictive model with the second predictive model.

13 Claims, 3 Drawing Sheets

Figure 1:
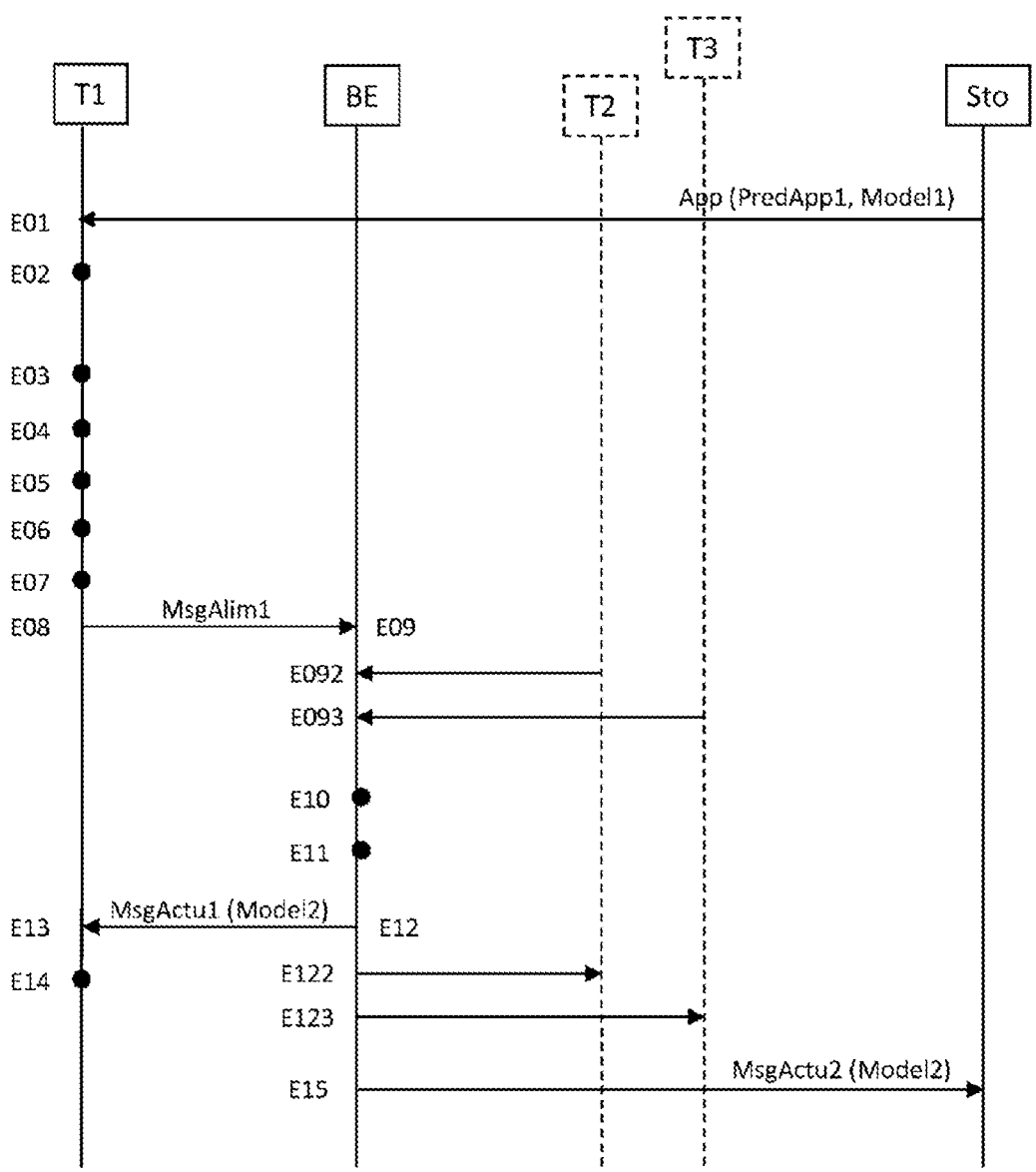

(58) Field of Classification Search
CPC ....... H04W 12/08; H04W 4/021; H04W 4/50; H04W 4/027; H04W 64/00; H04M 1/72577; H04M 1/72572
See application file for complete search history.

(56) References Cited

U.S. PATENT DOCUMENTS

2011/0045780 A1    2/2011   Ben Hadj et al.
2011/0070863 A1*   3/2011   Ma ........................ H04W 4/021
                                                                                                  455/410
2013/0198380 A1    8/2013   Oono \* cited by examiner

METHOD AND DEVICE FOR UPDATING A PREDICTIVE MODEL OF A VARIABLE RELATING TO A MOBILE TERMINAL

This application is the U.S. National Phase of Application No. PCT/FR2017/053074 entitled "METHOD AND DEVICE FOR UPDATING A PREDICTIVE MODEL OF A VARIABLE RELATING TO A MOBILE TERMINAL" and filed Nov. 10, 2017, which claims the benefit of French Patent Application No. 1660991, filed Nov. 14, 2016, each of which is incorporated by reference in its entirety.

1. FIELD OF THE INVENTION

The application for invention lies in the field of predictive models applied to mobile telecommunications, and more particularly in the field of updating predictive models of parameters relating to mobile networks and services, which are generated or measured by mobile terminals.

2. PRIOR ART

Current predictive modeling techniques (also known as machine learning) make it possible to predict or estimate the value of a particular variable, called target variable, on the basis of knowledge of values of other variables, called predictors, that are intrinsically linked thereto. From a set of representative data, called learning data, specialist mathematical algorithms are capable of learning the relationships that link a variable with others, whether or not these relationships are linear. There are numerous algorithms capable of establishing predictive models: "selective naive Bayes", neural networks, "random forest", "linear model", etc., and numerous tools or languages for instantiating them, such as R, Python, Weka, Spark MLlib, etc.

Moreover, by virtue of the creation of integrated circuits (or chipsets) for cellphones, which are becoming increasingly sophisticated in terms of computational power, in terms of miniaturization and in terms of power consumption, it is becoming increasingly simple to execute complex algorithms, such as those resulting from these predictive modeling techniques, on "smartphones".

However, these techniques exhibit a major drawback, namely in terms of updating them. Specifically, in order to remain relevant, a predictive model has to be updated regularly in order to integrate all changes affecting the environment of the target variable. For example, the ranges of values of the predictors or of the target variable may evolve, and a predictor may disappear, or a new predictor may appear. Updating the predictive models therefore requires periodically capturing new sets of learning data, and transferring them to the learning device, these representing tasks that are particularly unsuitable in the context of mobile telecommunications, where the radio bandwidth is precious and should be reserved as far as possible for use by users, and particularly to the flow of mobile data generated by the applications that they use.

One of the aims of the invention is to remedy these drawbacks of the prior art.

3. DISCLOSURE OF THE INVENTION

The invention aims to improve the situation by way of a method for updating a predictive model of a variable representative of the operation of a mobile terminal connected to a packet-switched communication network, a first predictive model being able to estimate a value of the variable, called estimated value, on the basis of the value of parameters, called predictors, linked to the variable by a common operating context, the method being implemented by the mobile terminal and comprising at least one cycle of the following steps:
measuring the variable, producing a measured value,
obtaining the values of the predictors,
estimating the estimated value using the first predictive model on the basis of the values of the predictors,
generating a feed message, comprising at least the measured value and the values of the predictors, if the difference between the measured value and the estimated value is greater than or equal to a determined threshold, called feed threshold,
the method furthermore comprising the following steps:
sending at least one generated feed message to an update server connected to the network,
receiving an update message, comprising a second predictive model updated on the basis at least of the feed message, from the update server,
replacing the first predictive model with the second predictive model.

The variable to be estimated may be for example the instantaneous bit rate that the terminal has for using applications requiring data to be exchanged with the network. In most cases, the data exchanged with the network are liable to be billed to the user of the mobile terminal on the basis of the volume thereof. For the user, the value of this bit rate determines whether or not an application is used on the cellphone, which consumes an amount priced at the volume. In this example, using a predictive model to estimate the instantaneous bit rate makes it possible to avoid data exchanges that are liable to be billed and that additionally overload the network. Therefore, the user may decide not to launch an application that risks not working correctly if the instantaneous bit rate is insufficient.

Variables linked by a common operating context of a mobile terminal are variables that represent observable and measurable characteristics during one and the same operating period of the mobile terminal. For example, the instantaneous bit rate that the terminal has on a connection to the network, the radio signal level captured by the mobile terminal, the signal-to-noise ratio of this signal and/or the CQI (channel quality indicator) are variables that are linked by the same operating context.

If the variable to be estimated, that is to say to be predicted without the requirement to measure it, is the instantaneous bit rate, good predictors will therefore be, a priori, the radio signal level captured by the mobile terminal, the signal-to-noise ratio and the CQI.

By virtue of the invention, the predictive model is updated while minimizing data exchanges. Specifically, the feed message used to update the predictive model is sent by the mobile terminal, and the resulting replacement predictive model is received by the terminal only if the contribution made by the data contained in the feed message to improving the predictive model is sufficient. One way of estimating this contribution is for example the difference between the instantaneous bit rate measured by the cellphone and the instantaneous bit rate estimated by the cellphone using the predictive model. If this difference is large, this means that the predictive model is able to be improved and that the measured bit rate value, as well as the values of the predictors, that the cellphone is able to provide may make a useful contribution to improving it.

According to one aspect of the invention, the feed threshold that is used is contained in a message received from the update server.

Advantageously, the update server exerts control over the criterion for the sending of the feed message by the mobile terminal. Thus, if the update server needs more data to improve the predictive model, it may trigger more frequent sending thereof by the mobile terminal by sending it a low threshold.

According to one aspect of the invention, the update message comprises an updated feed threshold, and the method furthermore comprises a step of replacing the feed threshold with the updated feed threshold.

Advantageously, the mobile terminal may update the feed threshold with the same frequency as the predictive model, without exchanging an additional message with the update server, and on the basis of the needs of the update server.

According to one aspect of the invention, the mobile terminal forms part of a set of mobile terminals, called collection set, and the second received predictive model is updated on the basis of a feed message sent by the mobile terminal and at least one other mobile terminal of the collection set.

Advantageously, in a first particular embodiment, the predictive model is improved not only with the data sent by the mobile terminal, but also with the data sent by other mobile terminals forming part of a set of terminals each implementing the update method according to the invention. The updated predictive model thus benefits from a wider set of data whose original contexts are varied, while at the same time being controlled by virtue of the feed thresholds, thereby ensuring better prediction probability for the model. The feed thresholds may be different between terminals of the collection set, depending on the needs of the update server.

According to one aspect of the invention, the update method furthermore comprises a step of generating a second predictive model on the basis of the first predictive model, of the measured value and of the values of the predictors, called locally updated predictive model, and the feed message furthermore comprises the locally updated predictive model.

Advantageously, in a second particular embodiment, the mobile terminal locally updates the local predictive model using its own data. It thus has an updated predictive model before any message exchange with the update server. However, the exchange is not eliminated, because otherwise the predictive model could not benefit from the contribution of the data from other mobile terminals. Unless an optional validation step invalidates the first updated model, for example because it does not improve the precision of the estimation of the variable, the exchange therefore takes place and the sent feed message comprises the first updated model, thereby making it possible to reduce the computations to be performed in the update server. The exchange is also triggered by comparison with the feed threshold, which it is possible to adjust in order to trigger a less frequent exchange, while at the same time taking into account the effectiveness of the locally updated predictive model.

According to one aspect of the invention, the update method comprises a preliminary step of obtaining the first predictive model from a storage server connected to the packet-switched communication network.

Advantageously, the terminal may obtain a first version of the first predictive model by downloading it from a storage server, which may be for example an "application store", such as "Apple Store" or "Google Play". The process implementing the invention is thus initialized in a conventional manner for the terminal, by installing a mobile application from a store, the application comprising a first predictive model.

The various aspects of the update method that have just been described are able to be implemented independently of one another or in combination with one another.

The invention also relates to a method for distributing a predictive model of a variable representative of the operation of a mobile terminal connected to a packet-switched communication network, called predictive model, a first predictive model being able to estimate a value of the variable, called estimated value, on the basis of the value of parameters, called predictors, linked to the variable by a common operating context, the method being implemented by an update server connected to the packet-switched communication network and comprising the following steps:

receiving, from the mobile terminal, a feed message comprising at least one measured value of the variable and values of the predictors, generating a second predictive model on the basis at least of the first predictive model and of the feed message, the second predictive model, called updated predictive model, being intended to replace the first predictive model, sending, to the mobile terminal, a first update message comprising the updated predictive model, sending, to a storage server connected to the packet-switched communication network, a second update message comprising the updated predictive model.

By virtue of the distribution method according to the invention, the predictive model is updated on the basis of real data from terminals using the predictive model. In addition, the updated model benefits not only the terminal that contributed to its improvement, but any terminal, by way of a storage server, which may be for example an "application store", such as "Apple Store" or "Google Play". The predictive model may be integrated into an application stored in the store, and this application may include a program allowing the terminal downloading the application to implement the update method described above, and thus to become a terminal that contributes to improving the predictive model. As an alternative, the application integrating the predictive model may include just a program allowing the terminal downloading the application just to use the predictive model, without it sending a feed message. One possible option may however be to receive the updated predictive models automatically.

According to one aspect of the invention, the first update message furthermore comprises a threshold relating to a maximum authorized difference between the estimated value and the measured value, called updated feed threshold.

Advantageously, the update server may send, to the terminal, a feed threshold updated on the basis of the data that it received in feed messages. Thus, if the predictive model updated with data from the terminal and from other terminals has made it possible to improve the effectiveness thereof, it is less necessary to update the predictive model. In this case, a higher threshold will make it possible to reduce the number of feed messages sent by the terminal or terminals and received by the update server.

According to one aspect of the invention, the distribution method furthermore comprises a step of validating the updated predictive model, and the sending steps are implemented only if the updated predictive model is more effective than the first predictive model.

According to one aspect of the invention, the feed message furthermore comprises the first predictive model, the first predictive model having been updated locally by the terminal, and the generation step comprises a step of aggregating the first predictive model with other predictive models updated locally by other terminals.

Advantageously, in the second particular embodiment of the invention in which the terminal is able to locally update its predictive model itself, the update server may take into account this predictive model so as to aggregate it with other predictive models updated locally by other mobile terminals, which the update server has also obtained in a similar way. A new predictive model may thus be generated by aggregating a plurality of predictive models each having been updated with different data by a plurality of mobile terminals. Numerous aggregation techniques exist that are known for improving the performance of a predictive model, depending on their type. For example, for a predictive model generated on the basis of random forest, the aggregation consists in grouping all of the decision trees of the random forests provided by the various terminals within one and the same resulting random forest. In the case of a predictive model generated on the basis of linear model, it is necessary to recover all of the weightings assigned to the predictors of each model so as to calculate average weightings for the aggregated model.

According to one aspect of the invention, the aggregation step furthermore comprises a preliminary step of checking the first predictive model, and the generation step takes into account the first predictive model only if the checking step shows that the first predictive model makes a useful contribution to the generated predictive model.

For example, if the difference between the measured and estimated values does not move, it may be the case that the generated predictive model is suffering from overfitting that favors the terminal to the detriment of other terminals implementing the same update method according to the invention.

The various aspects of the distribution method that have just been described are able to be implemented independently of one another or in combination with one another.

The invention also relates to a mobile terminal connected to a packet-switched communication network, able to update a predictive model of a variable representative of the operation of the mobile terminal, a first predictive model being able to estimate a value of the variable, called estimated value, on the basis of the value of parameters, called predictors, linked to the variable by a common operating context, comprising at least one processor configured so as to perform the following actions:
measure the variable, producing a measured value,
obtain the values of the predictors,
estimate the estimated value using the first predictive model on the basis of the values of the predictors,
generate a feed message, comprising at least the measured value and the values of the predictors, if the difference between the measured value and the estimated value is greater than or equal to a determined threshold, called feed threshold,
send at least one generated feed message to an update server connected to the network,
receive an update message, comprising a second predictive model updated on the basis at least of the feed message, from the update server,
replace the first predictive model with the second predictive model.

This mobile terminal is able to implement, in all of its embodiments, the update method that has just been described.

The invention also relates to an update server connected to a packet-switched communication network, able to distribute a predictive model of a variable representative of the operation of a mobile terminal connected to the packet-switched communication network, called predictive model, a first predictive model being able to estimate a value of the variable, called estimated value, on the basis of the value of parameters, called predictors, linked to the variable by a common operating context, comprising at least one processor configured so as to perform the following actions:
receive, from the mobile terminal, a feed message comprising at least one measured value of the variable and values of the predictors,
generate a second predictive model on the basis at least of the first predictive model and of the feed message, the second predictive model, called updated predictive model, being intended to replace the first predictive model,
send, to the mobile terminal, a first update message comprising the updated predictive model,
send, to a storage server connected to the packet-switched communication network, a second update message comprising the updated predictive model.

This update server is able to implement, in all of its embodiments, the distribution method that has just been described.

The invention furthermore relates to a system for updating and distributing a predictive model, comprising at least one mobile terminal such as the one that has just been described, an update server such as the one that has just been described, and a predictive model storage server.

The invention also relates to a computer program comprising instructions for the implementation of the steps of the update method that has just been described when this program is executed by a processor.

This program may use any programming language, and be in the form of source code, object code, or of intermediate code between source code and object code, such as in a partially compiled form, or in any other desirable form.

The invention also targets an information medium able to be read by a mobile terminal and including computer program instructions, such as mentioned above.

The information medium may be any entity or device capable of storing the program. For example, the medium may include a storage means, such as a ROM, for example a CD-ROM or a microelectronic circuit ROM, or else a magnetic recording means, for example a floppy disk or a hard disk.

Moreover, the information medium may be a transmissible medium such as an electrical or optical signal, which may be routed via an electrical or optical cable, by radio or by other means. The program according to the invention may in particular be downloaded from an Internet network.

Alternatively, the information medium may be an integrated circuit in which the program is incorporated, the circuit being designed to execute or to be used in the execution of the methods in question.

In particular, the information medium may be an "application store" for mobile terminals, such as the stores known under their commercial names "Apple Store" or "Google Play".

4. PRESENTATION OF THE FIGURES

Figure 2:
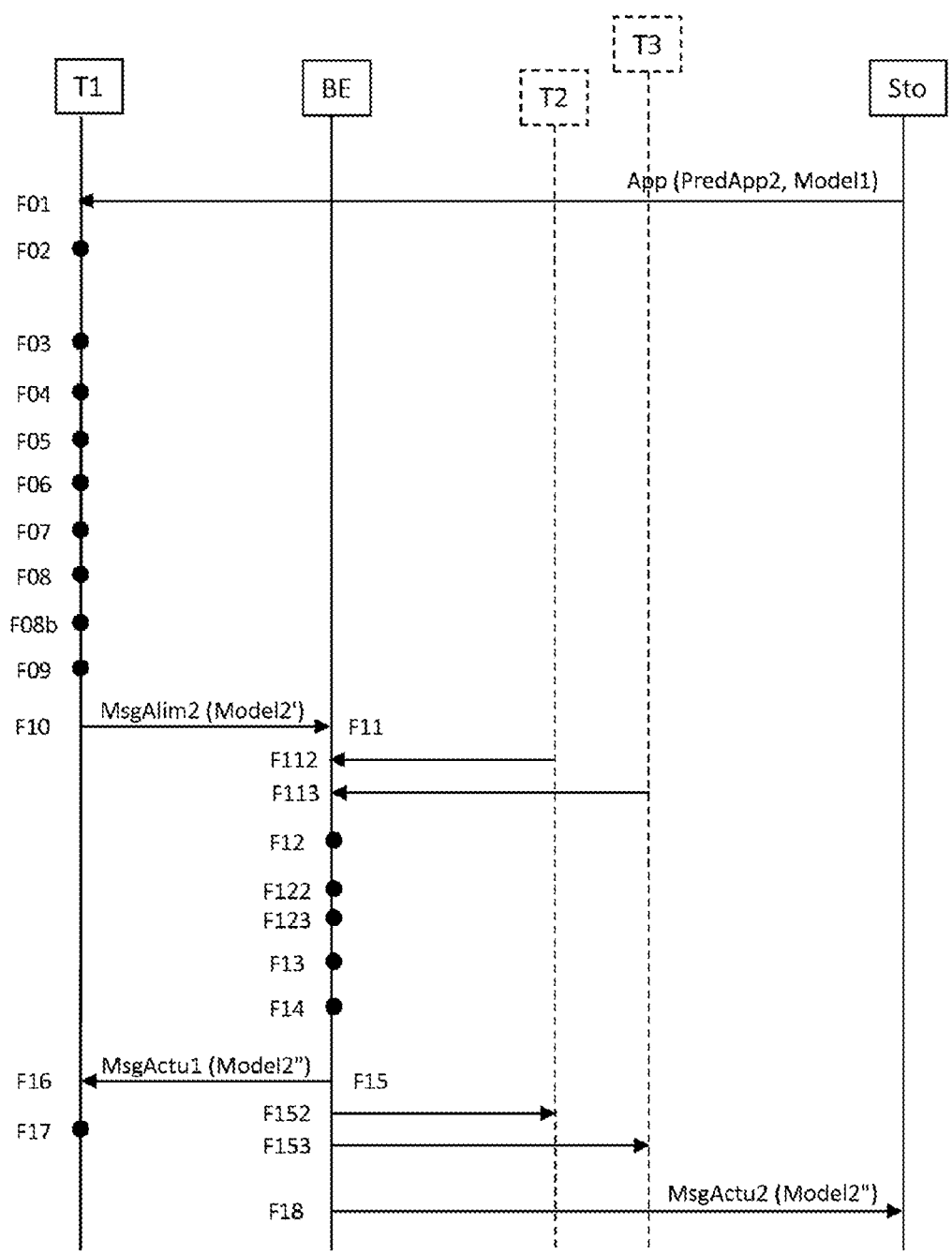
Figure 3:
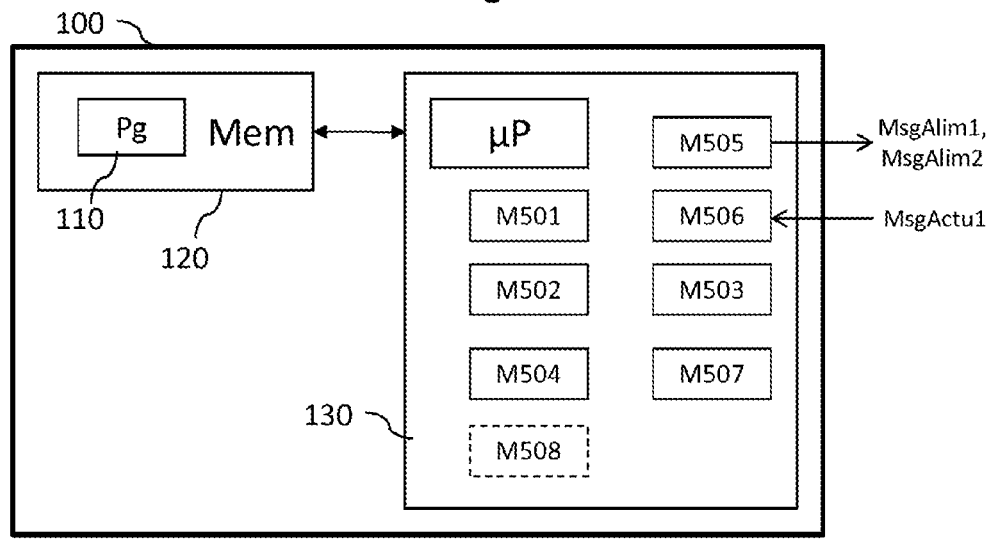
Figure 4:
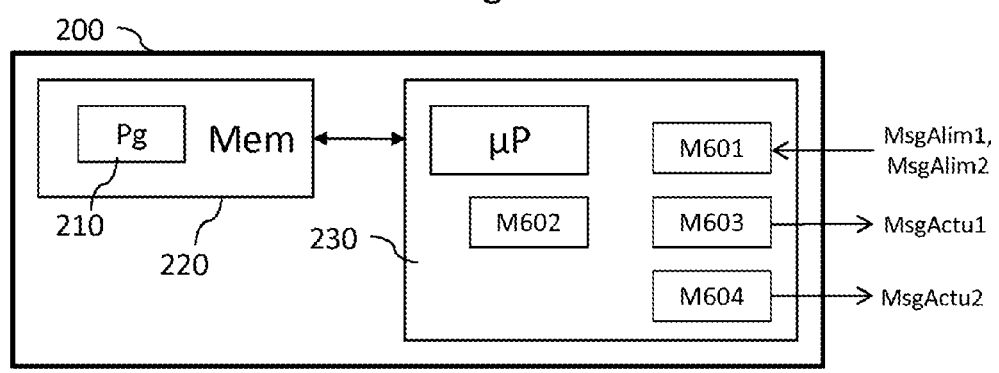

Other advantages and features of the invention will become more clearly apparent from reading the following description of a particular embodiment of the invention, given by way of simple illustrative and nonlimiting example, and the appended drawings, in which:

FIG. 1 shows an example of the sequence and implementation of the steps of the method for updating a predictive model of a variable representative of the operation of a mobile terminal and of the method for distributing a predictive model of a variable representative of the operation of a mobile terminal, according to a first embodiment of the invention, FIG. 2 shows an example of the sequence and implementation of the steps of the method for updating a predictive model of a variable representative of the operation of a mobile terminal and of the method for distributing a predictive model of a variable representative of the operation of a mobile terminal, according to a second embodiment of the invention, FIG. 3 shows an example of a structure of a device for updating a predictive model of a variable representative of the operation of a mobile terminal, according to one aspect of the invention, FIG. 4 shows an example of a structure of a device for distributing a predictive model of a variable representative of the operation of a mobile terminal, according to one aspect of the invention.

5. DETAILED DESCRIPTION OF AT LEAST ONE EMBODIMENT OF THE INVENTION

In the remainder of the description, examples of several embodiments of the invention are presented that are based on estimating the instantaneous bit rate of a mobile terminal, but the invention also applies to any other variable representative of the operation of a mobile terminal connected to a packet-switched communication network, regardless of the protocol for the connection of this terminal to this network.

FIG. 1 shows an example of the sequence and implementation of the steps of the method for updating a predictive model of a variable representative of the operation of a mobile terminal and of the method for distributing a predictive model of a variable representative of the operation of a mobile terminal, according to a first embodiment of the invention.

In this example, the variable representative of the operation of the terminal T1 is the instantaneous bit rate. The instantaneous bit rate determines the execution, on the terminal, of certain applications requiring high-volume data exchanges.

The terminal T1 has to have obtained a first predictive model for estimating the instantaneous bit rate beforehand. This may be performed for example on the initiative of the user in a step E01 in which the terminal downloads, from the storage server Sto, which may be an "application store", a mobile telephone or tablet application PredApp1 comprising the first predictive model Model1, followed by step E02 in which the application and the model Model1 are installed in a random access memory of the terminal T1. For example, with reference to FIG. 3, an update device 100 of the terminal T1 comprises a processing unit 130, equipped for example with a microprocessor µP, and driven by a computer program 110, stored in a memory 120 and implementing the update method according to the invention. On initialization, the code instructions of the computer program 110 corresponding to the application PredApp1 are for example loaded into a RAM memory, before being executed by the processor of the processing unit 130.

The initial version of this first predictive model Model1 may be established using a method that is known and separate from the methods according to the invention, which will therefore not be described here.

Steps E03 to E08, E13 and E14 form part of the update method according to the first embodiment of the invention, and are implemented in the terminal T1.

Steps E09 to E12 and E15 form part of the distribution method according to the first embodiment of the invention, and are implemented in the server BE, which is a server of the network, called update server, able to update the predictive model with new learning data and to distribute said model to terminals, such as the terminal T1, and/or to an "application store", such as the server Sto.

In a step E03, the terminal T1 measures the instantaneous bit rate Mvar that it has over its radio connection with the packet-switched communication network, and thus obtains a value of the variable Mvar.

In a step E04, the terminal T1 measures values of the predictors Pred1, Pred2, etc., or obtains them in any way. These predictors are for example: the radio signal level captured by the mobile terminal, the signal-to-noise ratio, the CQI.

In a step E05, the terminal T1 calculates a value Evar of the instantaneous bit rate through estimation using the predictive model Model1 and the predictors Pred1, Pred2, etc.

It is understood that, the larger the difference between the values Evar and Mvar, the more the predictive model Model1 is able to be improved.

In a step E06, the terminal T1 compares the difference between Evar and Mvar with a feed threshold S1. If this difference is greater than or equal to S1, the update method continues. Otherwise, it stops, in order to restart in step E03, after an interval determined for example by the application PredApp1, which is downloaded and installed in steps E01 and E02.

The feed threshold S1 used in step E06 is also for example itself determined by this same application PredApp1, or obtained with the application in step E01. Alternatively, it may be transmitted to the terminal T1 in a message from the update server BE.

In a step E07, the terminal T1 generates a feed message MsgAlim1 comprising the value Mvar and the values of the predictors Pred1, Pred2, etc.

In a step E08, the terminal T1 sends the feed message MsgAlim1 to the update server BE.

The update server BE receives the feed message MsgAlim1 from the terminal T1 in a step E09.

In similar steps E092, E093, etc., the server BE may receive other feed messages from other terminals T2, T3, etc. having installed the same application PredApp1 as the terminal T1. These terminals, with T1, form part of a set of terminals, called collection terminals.

In a step E10, the server BE generates a second predictive model Model2 on the basis of the first predictive model Model1 and by using the values contained in the feed message MsgAlim1, and, where applicable, contained in the other feed messages received from other collection terminals.

In an optional step E11, the server BE validates the generated predictive model Model2, for example by checking that the difference between measured and estimated values of the instantaneous bit rate has indeed decreased in comparison with the first predictive model Model1. If this is the case, the distribution method implemented by the server BE continues. Otherwise, it stops, in order to restart after receiving new feed messages, for example in step E09.

In a step E12, the server BE sends a first update message MsgActu1, comprising the updated predictive model Model2, to the terminal T1. Similarly, in steps E122, E123, etc., the server BE sends the same update message MsgActu1 to the other collection terminals T2, T3, etc.

Optionally, the server BE calculates a new value of the feed threshold S1, intended to replace the value that the terminals T1, T2, T3, etc. have in memory, and inserts this new value into the message MsgActu1. This makes it possible to update the feed threshold on the basis of the effectiveness of the predictive model, from the point of view of the server BE. It is thus possible to reduce the exchanges of messages with the terminals by increasing the threshold if the effectiveness is good.

In a step E15, the server BE sends a second update message MsgActu2, comprising the updated predictive model Model2, to the storage server Sto, which is thus able to update the application PredApp1 with the new updated predictive model Model2. The mobile terminals downloading and subsequently installing the application PredApp1 are thus able to benefit from the same version of the predictive model as the collection terminals that contributed to the improvement thereof. The sending frequencies of the messages MsgActu1 and MsgActu2 may be different, for example in order to give preference to the collection terminals over terminals subsequently installing the application PredApp1.

In a step E13, the terminal T1 receives the update message MsgActu1 comprising the updated predictive model Model2. If this message also comprises a feed threshold value, the terminal T1 replaces the old value of the threshold S1 with this value, for future use.

In a step E14, the terminal T1 replaces the predictive model Model1 with the updated predictive model Model2, whose prediction performance is better. Thus, during normal use of the predictive model outside of the update method according to the invention, the terminal T1 is able to estimate its instantaneous bit rate with greater accuracy, without having to measure it.

FIG. 2 shows an example of the sequence and implementation of the steps of the method for updating a predictive model of a variable representative of the operation of a mobile terminal and of the method for distributing a predictive model of a variable representative of the operation of a mobile terminal, according to a second embodiment of the invention.

As in the previous example, the variable representative of the operation of the terminal T1 is the instantaneous bit rate. The instantaneous bit rate determines the execution, on the terminal, of certain applications requiring high-volume data exchanges. This second embodiment differs mainly from the first one in that the terminal T1 locally generates a second predictive model Model2' on the basis of the first predictive model Model1, and sends it to the update server BE in the feed message so that it is taken into account in the generation of the new predictive model Model2", which is updated centrally by the update server BE.

The terminal T1 has to have obtained a first predictive model for estimating the instantaneous bit rate beforehand. This may be performed for example on the initiative of the user in a step F01 in which the terminal downloads, from the storage server Sto, which may be an "application store", a mobile telephone or tablet application PredApp2 comprising the first predictive model Model1, followed by step F02 in which the application and the model Model1 are installed in a random access memory of the terminal T1. For example, with reference to FIG. 3, an update device 100 of the terminal T1 comprises a processing unit 130, equipped for example with a microprocessor μP, and driven by a computer program 110, stored in a memory 120 and implementing the update method according to the invention. On initialization, the code instructions of the computer program 110 corresponding to the application PredApp2 are for example loaded into a RAM memory, before being executed by the processor of the processing unit 130.

The initial version of this first predictive model Model1 may be established using a method that is known and separate from the methods according to the invention, which will therefore not be described here.

Steps F03 to F10, F16 and F17 form part of the update method according to this second embodiment of the invention, and are implemented in the terminal T1.

Steps F11 to F15 and F18 form part of the distribution method according to this second embodiment of the invention, and are implemented in the server BE, which is a server of the network, called update server, able to update the predictive model with new learning data and with new locally updated models, and to distribute said model to terminals, such as the terminal T1, and/or to an "application store", such as the server Sto.

In a step F03 identical to step E03, the terminal T1 measures the instantaneous bit rate Mvar that it has over its radio connection with the packet-switched communication network, and thus obtains a value of the variable Mvar.

In a step F04 identical to step E04, the terminal T1 measures values of the predictors Pred1, Pred2, etc., or obtains them in any way.

In a step F05 identical to step E05, the terminal T1 calculates a value Evar of the instantaneous bit rate through estimation using the predictive model Model1 and the predictors Pred1, Pred2, etc.

It is understood that, the larger the difference between the values Evar and Mvar, the more the predictive model Model1 is able to be improved.

In a step F06 identical to step E06, the terminal T1 compares the difference between the values Evar and Mvar with a feed threshold S1. If this difference is greater than or equal to S1, the update method continues. Otherwise, it stops, in order to restart in step F03, after an interval determined for example by the application PredApp2, which is downloaded and installed in steps F01 and F02.

The feed threshold S1 used in step F06 is also for example itself determined by this same application PredApp1, or obtained with the application in step F01. Alternatively, it may be transmitted to the terminal T1 in a message from the update server BE.

In a step F07, the terminal T1 locally generates a second predictive model Model2' on the basis of the first predictive model Model1 and by using the value Mvar and the values of the predictors Pred1, Pred2, etc.

In a step F08, the terminal T1 validates the locally generated predictive model Model2', for example by checking that the difference between measured and estimated value of the instantaneous bit rate has indeed decreased in comparison with the first predictive model Model1. If this is the case, the update method implemented by the terminal T1 continues. Otherwise, it stops, in order to restart in step F03, after the abovementioned determined interval.

In an optional step F08b, the terminal T1 replaces the predictive model Model1 with the locally updated predictive model Model2', whose prediction performance is better.

In a step F09, the terminal T1 generates a feed message MsgAlim2 comprising the predictive model Model2' updated locally by the terminal T1, the value Mvar and the values of the predictors Pred1, Pred2, etc.

In a step F10, the terminal T1 sends the feed message MsgAlim2 to the update server BE.

The update server BE receives the feed message MsgAlim2 from the terminal T1 in a step F11.

In similar steps F112, F113, etc., the server BE may receive other feed messages from other terminals T2, T3, etc. having installed the same application PredApp2 as the terminal T1. These terminals, with T1, form part of a set of terminals, called collection terminals.

In a step F12, the server BE checks that the potential contribution of each terminal is useful. To this end, the server BE checks that the predictive models sent by each terminal are not subject to overfitting ("overfitting check"), that is to say linked too strongly to the data that were used to create them or to update them. The overfitting check consists in using the predictive model from one terminal with the predictors from another terminal; the more the model is subject to overfitting, the larger the difference will be between estimated and measured values.

In a step F13, the server BE generates a new predictive model, Model2", by aggregating the locally updated predictive models that it received from the terminals in steps F11, F112, F113, etc., including the second predictive model Model2' received in step F11, if this has been validated by the checking step F12. The model aggregation technique that is used depends on the technique inherent to the predictive model that is used, and is not described here.

In an optional step F14, the server BE validates the predictive model Model2" generated by aggregation, for example by checking that the difference between measured and estimated values of the instantaneous bit rate has indeed decreased in comparison with the first predictive model Model1. If this is the case, the distribution method implemented by the server BE continues. Otherwise, it stops, in order to restart after receiving new feed messages, for example in step F11.

In a step F15, the server BE sends a first update message MsgActu1, comprising the updated predictive model Model2", to the terminal T1. Similarly, in steps F152, F153, etc., the server BE sends the same update message MsgActu1 to the other collection terminals T2, T3, etc.

Optionally, the server BE calculates a new value of the feed threshold S1, intended to replace the value that the terminals T1, T2, T3, etc. have in memory, and inserts this new value into the message MsgActu1. This makes it possible to update the feed threshold on the basis of the effectiveness of the predictive model, from the point of view of the server BE. It is thus possible to reduce the exchanges of messages with the terminals by increasing the threshold if the effectiveness is good.

In a step F18, the server BE sends a second update message MsgActu2, comprising the updated predictive model Model2", to the storage server Sto, which is thus able to update the application PredApp2 with the new updated predictive model Model2". The mobile terminals downloading and subsequently installing the application PredApp2 are thus able to benefit from the same version of the predictive model as the collection terminals that contributed to the improvement thereof. The sending frequencies of the messages MsgActu1 and MsgActu2 may be different, for example in order to give preference to the collection terminals over terminals subsequently installing the application PredApp2.

In a step F16, the terminal T1 receives the update message MsgActu1 comprising the updated predictive model Model2". If this message also comprises a feed threshold value, the terminal T1 replaces the old value of the threshold S1 with this value, for future use.

In a step F17, the terminal T1 replaces the predictive model Model1 or Model2', as the case may be, with the updated predictive model Model2", whose prediction performance is better. Thus, during normal use of the predictive model outside of the update method according to the invention, the terminal T1 is able to estimate its instantaneous bit rate with greater accuracy, without having to measure it.

FIG. 3 shows an example of a structure of a device for updating a predictive model of a variable representative of the operation of a mobile terminal, according to one aspect of the invention.

The update device 100 implements the update method, various embodiments of which have just been described.

Such a device 100 may be implemented in a mobile terminal able to connect to any type of packet-switched communication network, such as 4G, Wi-Fi, etc.

For example, the device 100 comprises a processing unit 130, equipped for example with a microprocessor μP, and driven by a computer program 110, stored in a memory 120 and implementing the update method according to the invention. On initialization, the code instructions of the computer program 110 are for example loaded into a RAM memory, before being executed by the processor of the processing unit 130.

Such a memory 120 and such a processor of the processing unit 130 are able to and configured so as to control hardware modules or software modules of the device 100, including:
- a module M501 able to measure an operating variable of a mobile terminal, producing a measured value,
- a module M502 able to obtain values of predictors linked to the variable by a common operating context,
- a module M503 able to estimate a value of the operating variable, using a first predictive model and on the basis of the values of the predictors,
- a module M504 able to generate a feed message, comprising at least the measured value and the values of the predictors, if the difference between the measured value and the estimated value is greater than or equal to a determined threshold, called feed threshold,
- a module M505 able to send the generated supply message MsgAlim1 or MsgAlim2 to an update server connected to the network,
- a module M506 able to receive an update message MsgActu1, comprising a second predictive model updated on the basis at least of the feed message, from the update server,
- a module M507 able to replace the first predictive model with the second predictive model,
- and, in one particular embodiment of the invention, a module M508 able to locally generate a second predictive model on the basis of the first predictive model, of the measured value and of the values of the predictors, called locally updated predictive model, the feed message MsgAlim1 or MsgAlim2 furthermore comprising this locally updated predictive model.

FIG. 4 shows an example of a structure of a device for distributing a predictive model of a variable representative of the operation of a mobile terminal, according to one aspect of the invention.

The distribution device 200 implements the distribution method, various embodiments of which have just been described.

Such a device 200 may be implemented in a server able to connect to any type of packet-switched communication network, such as 4G, Wi-Fi, etc.

For example, the device 200 comprises a processing unit 230, equipped for example with a microprocessor µP, and driven by a computer program 210, stored in a memory 220 and implementing the distribution method according to the invention. On initialization, the code instructions of the computer program 210 are for example loaded into a RAM memory, before being executed by the processor of the processing unit 230.

Such a memory 220 and such a processor of the processing unit 230 are able to and configured so as to control hardware modules or software modules of the device 200, including:
- a module M601 able to receive, from a mobile terminal connected to the packet-switched communication network, a feed message MsgAlim1 or MsgAlim2, comprising at least one measured value of an operating variable of the terminal and values of predictors linked by one and the same operating context,
- a module M602 able to generate a second predictive model on the basis at least of a first predictive model and of the feed message MsgAlim1 or MsgAlim2, the second predictive model, called updated predictive model, being intended to replace the first predictive model,
- a module M603 able to send, to the mobile terminal, a first update message MsgActu1 comprising the updated predictive model,
- a module M604 able to send, to a storage server connected to the packet-switched communication network, a second update message MsgActu2 comprising the updated predictive model.

FIGS. 3 and 4 illustrate just one particular way from among several possible ones of implementing the methods described above with reference to FIGS. 1 and 2. Specifically, the technique of the invention is carried out indiscriminately on a reprogrammable computing machine (a PC, a DSP processor or a microcontroller) executing a program comprising a sequence of instructions, or on a dedicated computing machine (for example a set of logic gates such as an FPGA or an ASIC, or any other hardware module).

If the invention is installed on a reprogrammable computing machine, the corresponding program (that is to say the sequence of instructions) may be stored in a removable storage medium (such as for example a floppy disk, a CD-ROM or a DVD-ROM) or a non-removable storage medium, this storage medium being able to be read partly or fully by a computer or a processor.

The exemplary embodiments of the invention that have just been presented are merely a few of the conceivable embodiments. They show that the invention makes it possible to use predictive models for an operating variable of a mobile terminal, these predictive models being updated using data from an entire fleet of mobile terminals in real time, while at the same time minimizing the radio bandwidth used by the messages feeding and updating the predictive models.

The invention claimed is:

1. A method of updating a predictive model of a variable representative of the operation of a mobile terminal connected to a packet-switched communication network, a first predictive model configured to estimate an estimated value of the variable on the basis of the value of predictors linked to the variable by a common operating context, the method implemented by the mobile terminal and comprising:
   - generating a feed message, the feed message comprising at least a measured value and values of the predictors, if the difference between the measured value and an estimated value is greater than or equal to a determined feed threshold, the estimated value being estimated using the first predictive model on the basis of the values of the predictors;
   - sending the generated feed message to an update server connected to the network;
   - receiving an update message from the update server, the update message comprising a second predictive model updated on the basis of at least the feed message; and
   - replacing the first predictive model with the second predictive model.

2. The method of claim 1, wherein the feed threshold that is used is contained in a message received from the update server.

3. The method of claim 1, wherein the update message comprises an updated feed threshold, and wherein the method further comprises replacing the feed threshold with the updated feed threshold.

4. The method of claim 1, wherein the mobile terminal forms part of a collection set of mobile terminals, and wherein the second received predictive model is updated on the basis of a feed message sent by the mobile terminal and at least one other mobile terminal of the collection set.

5. The method of claim 1, further comprising generating a locally updated predictive model on the basis of the first predictive model, of the measured value and of the values of the predictors, and wherein the feed message further comprises the locally updated predictive model.

6. The method of claim 1, further comprising obtaining the first predictive model from a storage server connected to the packet-switched communication network prior to generating the feed message.

7. A non-transitory computer readable medium comprising instructions, which when executed by a processor of a mobile terminal, cause the processor to implement the method of claim 1.

8. The method of claim 1, wherein the mobile terminal is a smartphone.

9. A method of distributing a predictive model of a variable representative of the operation of a mobile terminal connected to a packet-switched communication network, a first predictive model being configured to estimate an estimated value of the variable on the basis of the value of predictors linked to the variable by a common operating context, the method being implemented by an update server connected to the packet-switched communication network and comprising:
   - receiving, from the mobile terminal, a feed message comprising at least one measured value of the variable and values of the predictors,
   - generating an updated predictive model on the basis of at least the first predictive model and the feed message, the updated predictive model being intended to replace the first predictive model,
   - sending, to the mobile terminal, a first update message comprising the updated predictive model,
   - sending, to a storage server connected to the packet-switched communication network, a second update message comprising the updated predictive model.

10. The method of claim 9, wherein the first update message furthermore comprises a threshold relating to a maximum authorized difference between the estimated value and the measured value, called updated feed threshold.

11. The method of claim 9, wherein the feed message further comprises the first predictive model, the first predictive model having been updated locally by the terminal, and wherein the generation step comprises aggregating the first predictive model with other predictive models updated locally by other terminals.

12. A mobile terminal connected to a packet-switched communication network, the mobile terminal configured to update a predictive model of a variable representative of the operation of the mobile terminal, a first predictive model configured to estimate an estimated value of the variable on the basis of the value of predictors linked to the variable by a common operating context, comprising at least one processor configured to:
  generate a feed message, the feed message comprising at least a measured value and values of the predictors, if the difference between the measured value and the estimated value is greater than or equal to a determined threshold, called feed threshold, the estimated value being estimated using the first predictive model on the basis of the values of the predictors;
  send the generated feed message to an update server connected to the network;
  receive an update message from the update server, the update message comprising a second predictive model updated on the basis of at least the feed message; and
  replace the first predictive model with the second predictive model.

13. A system for updating and distributing a predictive model, the system comprising the mobile terminal of claim 12, a predictive model storage server, and an update server connected to a packet-switched communication network, the update server configured to distribute a predictive model of a variable representative of the operation of a mobile terminal connected to the packet-switched communication network, a first predictive model configured to estimate an estimated value of the variable on the basis of the value of predictors linked to the variable by a common operating context, the updated server comprising at least one processor configured to:
  receive, from the mobile terminal, a feed message comprising at least one measured value of the variable and values of the predictors,
  generate an updated predictive model on the basis at least of the first predictive model and of the feed message, the updated predictive model being intended to replace the first predictive model,
  send, to the mobile terminal, a first update message comprising the updated predictive model,
  send, to a storage server connected to the packet-switched communication network, a second update message comprising the updated predictive model.

* * * * *